US008078760B2

(12) United States Patent
King et al.

(10) Patent No.: US 8,078,760 B2
(45) Date of Patent: Dec. 13, 2011

(54) DIGITAL ASSET FORMAT TRANSFORMATION

(75) Inventors: Brian King, Redmond, WA (US);
Robert S. Dietz, Bellevue, WA (US);
Kathleen P. Mulcahy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 12/124,146

(22) Filed: May 21, 2008

(65) Prior Publication Data
US 2009/0292823 A1 Nov. 26, 2009

(51) Int. Cl.
*G06F 15/16* (2006.01)
(52) U.S. Cl. ......... 709/246; 713/193; 709/250; 709/202
(58) Field of Classification Search .................... 709/246
See application file for complete search history.

(56) References Cited

U.S. PATENT DOCUMENTS

| | | | | |
|---|---|---|---|---|
| 6,144,988 | A * | 11/2000 | Kappel | 709/202 |
| 6,357,006 | B1 * | 3/2002 | Pham et al. | 713/176 |
| 7,694,313 | B2 * | 4/2010 | O'Shaughnessy et al. | 719/321 |
| 2002/0184197 | A1 | 12/2002 | He et al. | |
| 2003/0043975 | A1 | 3/2003 | Bhogal et al. | |
| 2003/0177187 | A1 * | 9/2003 | Levine et al. | 709/205 |
| 2004/0059929 | A1 * | 3/2004 | Rodgers et al. | 713/193 |
| 2005/0177849 | A1 * | 8/2005 | Pietraszak et al. | 725/44 |
| 2005/0213760 | A1 * | 9/2005 | LeComte et al. | 380/217 |
| 2005/0262181 | A1 * | 11/2005 | Schmidt et al. | 709/200 |
| 2006/0015649 | A1 | 1/2006 | Zutaut et al. | |
| 2006/0117045 | A1 * | 6/2006 | Phillips et al. | 707/100 |
| 2006/0230184 | A1 * | 10/2006 | Velline et al. | 709/246 |
| 2006/0242669 | A1 * | 10/2006 | Wogsberg | 725/74 |
| 2007/0011604 | A1 | 1/2007 | Chiu | |
| 2007/0058596 | A1 | 3/2007 | Frid-Nielsen et al. | |
| 2007/0118612 | A1 | 5/2007 | Buckley et al. | |
| 2007/0180485 | A1 * | 8/2007 | Dua | 725/114 |
| 2007/0239761 | A1 * | 10/2007 | Baio et al. | 707/102 |
| 2008/0005227 | A1 | 1/2008 | Subbian | |
| 2009/0234823 | A1 * | 9/2009 | Wong | 707/4 |

FOREIGN PATENT DOCUMENTS

| | | |
|---|---|---|
| WO | WO0186986 A1 | 11/2001 |
| WO | WO2006000975 A1 | 1/2006 |

OTHER PUBLICATIONS

Edmonds, "Adapt Web Sites to Small Screens with Frontpage Add-Ins", 2008, Microsoft Corporation, pp. 6.
Cokus, et al., "XML Binary Characterization Use Cases", Mar. 31, 2005, W3C, pp. 71.
Helal, et al., "UbiData: Requirements and Architecture for Ubiquitous Data Access", SIGMOD Record, vol. 33, No. 4, Dec. 2004, pp. 71-76.

* cited by examiner

*Primary Examiner* — Wing Chan
*Assistant Examiner* — Tesfay Yohannes
(74) *Attorney, Agent, or Firm* — Alleman Hall McCoy Russell & Tuttle LLP

(57) ABSTRACT

A method for providing a digital asset to a remote recipient via a network. An unmodified digital asset is received in a native format, transformed into a derived digital asset having a non-native format, and offered to a remote recipient via the network. The method further includes sending the derived digital asset to the remote recipient in response to a request of the remote recipient.

21 Claims, 6 Drawing Sheets

| | BITMAP | JPEG | MP3 | MPEG | PDF | TEXT | WAV | WORD® |
|---|---|---|---|---|---|---|---|---|
| EXCEL® | | | | | A | A | | A |
| HTML | A | A | | | A | | | |
| POWERPOINT® | A | A | A | A | A | A | A | |
| WORD® | A | | | | | A | | |
| RSS FEED | A | | A | | | | | |
| MESSAGE-BOARD THREAD | A | A | A | | | | | |

FIG. 3

DIGITAL ASSET FORMAT TRANSFORMATION

BACKGROUND

A wealth of digital assets—video and music files, photographic images, presentations, documents, spreadsheets, message threads and RSS feeds, as examples—reside on digital storage media in many different formats. In recent years, digital assets have become increasingly distributable because of the development of world-wide, public networks, especially the Internet. Also in recent years, portable, handheld devices such as cellular phones, electronic games, and personal music players have become increasingly powerful and inexpensive. Handheld-device users can, to varying degrees, retrieve digital assets from public networks and use, review, or enjoy such assets.

Making digital assets more easily convertible from one format to another and from one device to another may further increase access to useful and enjoyable digital content. In addition, facile interconversion of information-packed digital assets may support group learning in progressive pedagogies and unconventional settings.

SUMMARY

Methods for providing a digital asset to a remote recipient via a network are disclosed herein. One exemplary method includes receiving an unmodified digital asset in a native format. The unmodified digital asset is then transformed from its native format into a derived digital asset having a non-native format. The derived digital asset with the non-native format is then offered to the remote recipient via the network. Upon receiving a request from the remote recipient, the derived digital asset with the non-native format is then sent to the remote recipient.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is a table that illustrates an example mapping of unmodified digital assets to derived digital assets.

DETAILED DESCRIPTION

Figure 1:
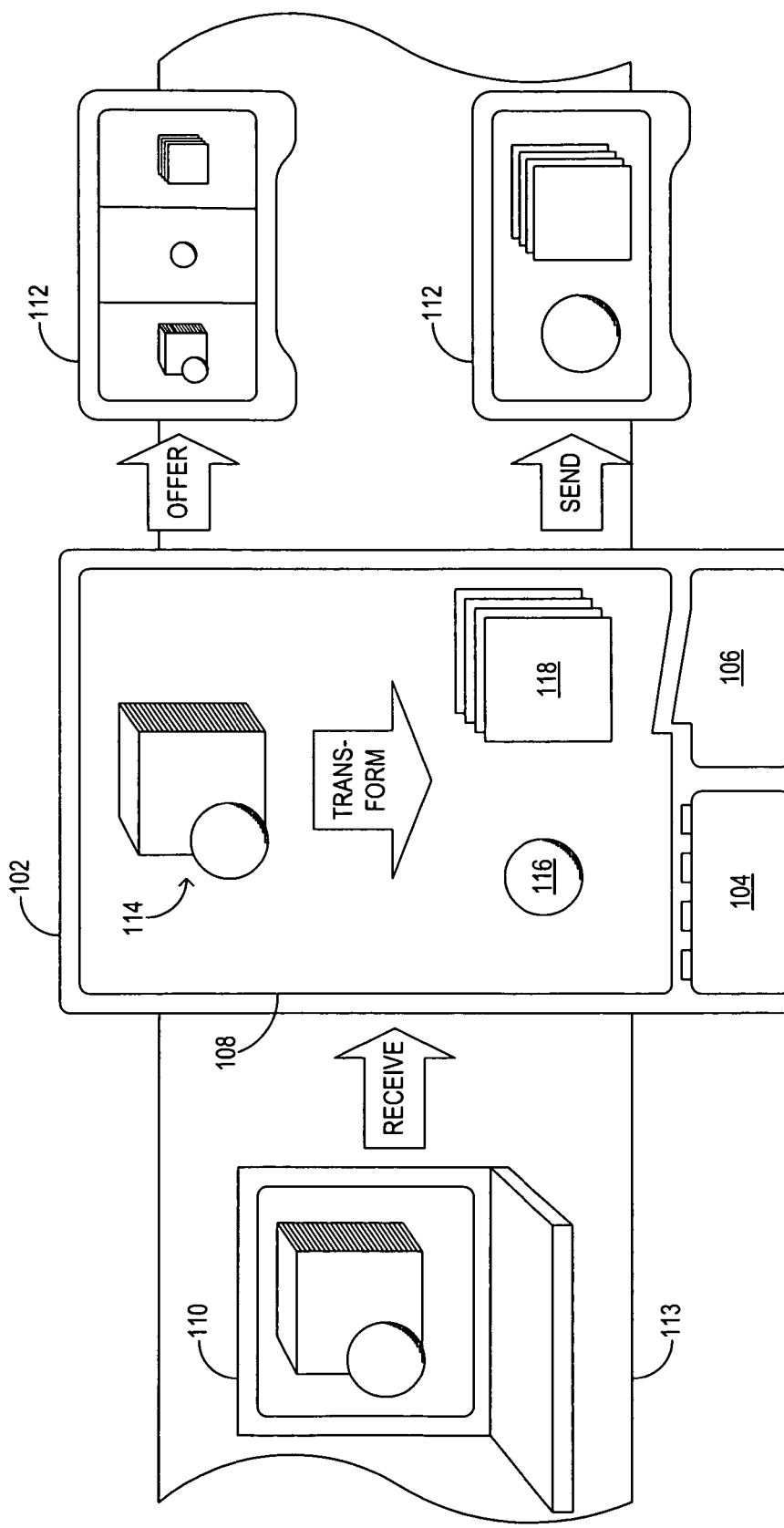
FIG. 1 shows an example configuration of networked components in accordance with the present disclosure.

FIG. 1 shows an example configuration of networked components. In particular, FIG. 1 shows server 102 with processor 104 and two segments of memory: code segment 106 and data segment 108. Data segment 108 stores digital assets, while code segment 106 stores instructions that enable the processor to perform server tasks. In particular, code segment 106 stores instructions that enable the processor to receive an unmodified digital asset in a native format from a remote source, to transform the unmodified digital asset into a derived digital asset stored in a non-native format, to offer the derived digital asset to a remote recipient via a network, and to send the derived digital asset to the remote recipient in response to a request of the remote recipient. While drawn as two intact segments, it should be understood that either or both of code segment 106 and data segment 108 may be distributed on multiple memory devices, and in other embodiments, both segments may reside on the same memory device.

FIG. 1 also shows remote source 110 and recipient device 112. In the illustrated embodiment, remote source 110 and recipient device 112 are configured to communicate with server 102 over network 113. The network may be the Internet or any other network, public or private. The network may comprise a network portal that supports the activities of a user group. Thus, remote source 110 and recipient device 112 may be operated by one or more users from within the user group. The remote source, the recipient device, and the server each include adequate hardware and software to send and receive communications over the network. A wired or wireless link between any of the above devices may be used to enable communication. In particular, the recipient device may be configured to send and receive wireless communications, e.g. cellular, infrared, Wi-Fi®, and/or Bluetooth®, as examples. Further, the remote source, the recipient device, and the server may be configured to use at least one common network protocol.

Stored in data segment 108 is unmodified digital asset 114, represented as a complex, geometrical shape. In the illustrated example, unmodified digital asset 114 is received by upload from remote source 110. Derived digital assets 116 and 118, each represented as simpler geometrical shapes, are also stored in data segment 108.

The information content of a digital asset may include text, images, and audio, as example categories. Some formats combine mixed information content from multiple categories. Movies and slide-show presentations, for example, may include text, audio, and sequenced images. Thus, the schematic representations of the digital assets in FIG. 1 are intended to suggest that, in some examples, the unmodified digital asset may contain complex, composed, or convoluted, mixed-content data, while the derived digital assets may contain simpler, decomposed, or deconvoluted data from single content categories. It should be understood, however, that in other examples, a derived digital asset may be equally or more complex than the unmodified digital asset from which it is derived; text to speech conversion illustrates one such example.

Processor 104 is configured, by way of the instructions in code segment 106, to transform unmodified digital asset 114 into derived digital assets 116 and 118 and to store the derived digital assets in data segment 108. Processor 104 is further and likewise configured to offer one or more of the derived digital assets to a remote recipient via the network. In the illustrated embodiment, the remote recipient accesses the network via recipient device 112, which may be virtually any handheld electronic device such as a game system, a personal digital assistant (PDA), a cell phone, or a personal music player. Processor 104 is further and likewise configured to send one or more of the derived digital assets to the recipient device at a request of the remote recipient. Although recipient device 112 is represented in FIG. 1 as a handheld device, it is further contemplated that the recipient device may in some embodiments be a laptop or even a desktop computer, from which a remote recipient may use or otherwise retransmit the derived digital asset to other recipients and/or devices.

In one non-limiting example, the unmodified digital asset may be a slide show, such as a PowerPoint® file; it may contain a sequence of slides and an audio track. One of the derived digital assets may be an audio file corresponding to the audio track in the original slide show, a WAV or MP3 file, for example. Another of the derived digital assets may be an indexed series of bitmap images. In another non-limiting example, the unmodified digital asset may include a first rendering of an image, the derived digital asset may include a second rendering of the same image, and at least one of a resolution, a size, and a color depth may be different in the first rendering than in the second rendering. Further, the transformation may be set by the limitations and type of recipient device as well as by user settings—whether settings of the remote source or of the remote recipient. Further still, the digital asset may change form in the process: text may be reconstituted as an image of the text if the recipient device lacks a capability to display text, or as sound if the recipient device has no display capability at all.

FIG. 1 shows two derived digital assets, as well as the unmodified digital asset, being offered to the remote recipient and appearing on a display screen of recipient device 112 (in the upper right-hand corner of the drawing). In the illustrated example, the remote recipient has requested to download both of the derived digital assets—the audio file as well as the indexed series of bitmap images—so these assets appear on the display screen (in the lower right-hand corner of the drawing). In other examples the remote recipient may instead have requested only one of the derived digital assets or none at all.

It should be understood that FIG. 1 is entirely schematic. The components included therein may include one or more aspects not shown in the figure, and the aspects that are shown are rendered in a simplified form. For example, server 102 may comprise a plurality of interconnected local or remote hardware components having one or more processors. It should further be understood that no aspect of FIG. 1 is intended to be limiting. Other contemplated embodiments include additional remote sources, each providing additional unmodified digital assets, and additional recipient devices, each receiving the same or additional derived digital assets. Thus, the server may be configured to receive and transform the additional unmodified digital assets and to store the additional derived digital assets.

Figure 2:
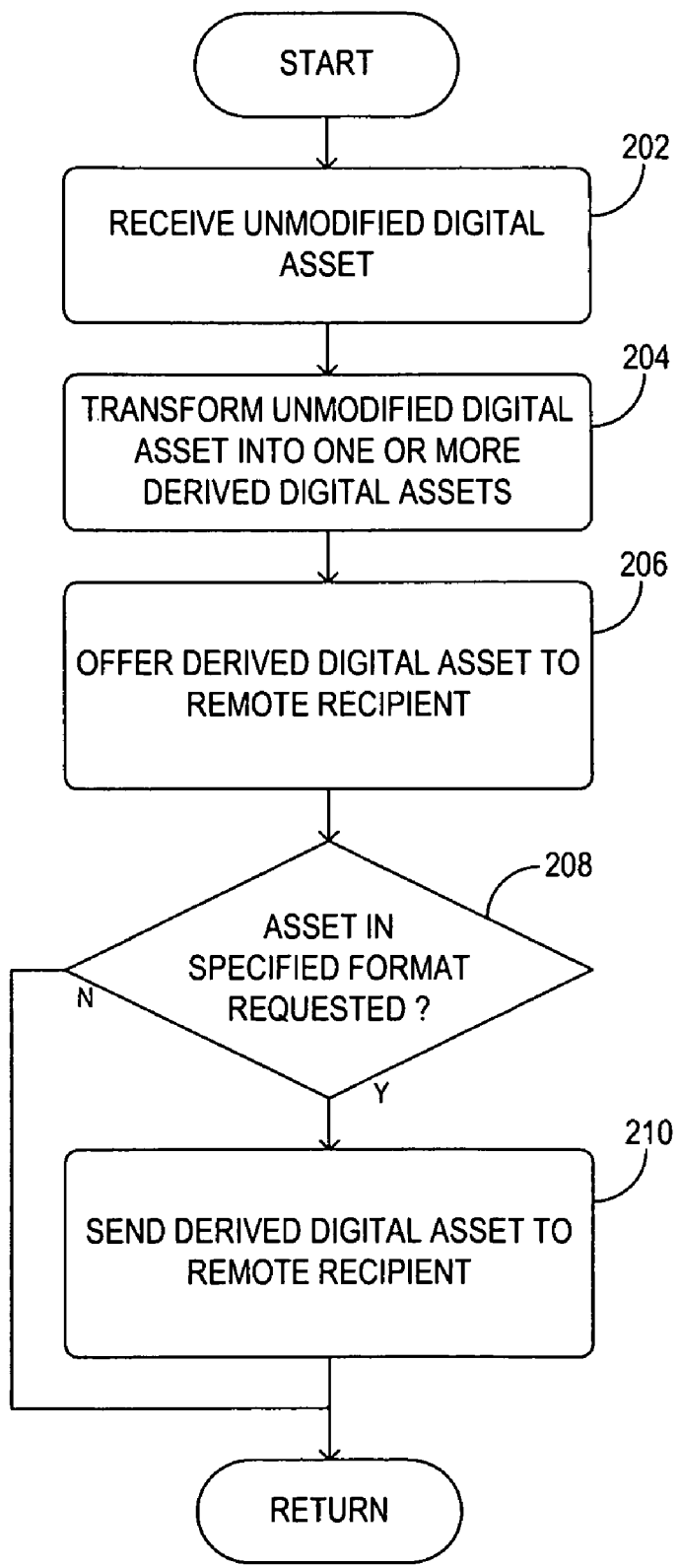
FIG. 2 illustrates an example method for providing a digital asset to a remote recipient via a network in accordance with the present disclosure.

FIG. 2 illustrates an example process flow 200 of a method for providing a digital asset to a remote recipient via a network. In describing the illustrated method, continued numerical reference is made to aspects of FIG. 1. The method of FIG. 2, in one example, is executed by server 102.

At 202, the server receives unmodified digital asset 114 in a native format. The server may receive the unmodified digital asset over network 113 from remote source 110. In one example, the remote source may be a user in a user group. In another example, a user in the user group may direct the asset to be received by the server from elsewhere—possibly from a remote network source. In yet another example, the unmodified digital asset may be received from the remote recipient: i.e., the remote recipient and the remote source may be the same.

At 204, the server transforms the unmodified digital asset, received in a native format, into one or more derived digital assets in non-native formats. The server may transform the unmodified digital asset into one or more derived digital assets at processor 104, according to instructions stored in code segment 106. In some embodiments, the transformation may involve opening a file corresponding to the unmodified digital asset stored in a native format, processing the data within the file, and then storing the processed data in a format different than the native format; the file so stored being one example of a derived digital asset having a non-native format. In other embodiments, the transformation may involve receiving a data stream such as an RSS feed in a native format, processing the data within the stream, and then retransmitting the data in a format different than the native format, whether as a file or not as a file. Thus, the retransmitted data stream is another example of a derived digital asset having a non-native format. The processing referred to above may include a data compression, a resolution reduction, a decomposition, a parsing, and/or a deconvolution, as examples.

Taken together, the one or more derived digital assets created by transformation at 204 constitute a first set. In the illustrated example, the transformation is triggered automatically upon receipt of the unmodified digital asset; it results in the first set of derived digital assets being stored in data segment 108 of the server. To facilitate the transformation, the server may maintain in data segment 108 a mapping in which a plurality of native formats is mapped onto a plurality of non-native formats. An example mapping is illustrated in FIG. 3.

The table in FIG. 3 represents an example mapping 300 of native formats to non-native formats. The rows of the table correspond to native formats 302 in which an unmodified digital asset may be received. The columns of the table correspond to non-native formats 304 into which the asset may be transformed. Certain digital-asset formats referred to in FIG. 3 and hereinafter are designated by commonly used abbreviations: thus, HTML designates a known Hypertext Mark-up Language format; JPEG designates a known format of the Joint Photographic Experts Group; MPEG designates a known format of the Moving Picture Experts Group; MP3 designates the MPEG Audio Layer 3 format; PDF designates a known Portable Document Format; and WAV designates a known wave file format. The above are only examples. The disclosed transformations may be applied to a digital asset having virtually any format.

In the illustrated embodiment of FIG. 2, the server is configured to automatically transform an unmodified digital asset received in a native format into a derived digital asset having a non-native format when the letter "A" appears at the intersection of the row corresponding to the native format and the column corresponding to the non-native format. It should be understood that other mappings can be applied to the same or different native and non-native formats. It should further be understood that in some alternate embodiments the mapping may be contained entirely within code segment 106.

Returning now to FIG. 2, the server, at 206, offers one or more derived digital assets to a remote recipient over the network. The remote recipient may come to be offered a derived digital asset by accessing a network site where digital assets are provided. The network site may be an Internet or intranet web page, such as a network portal of a user group, for example. The derived digital asset or assets offered to the remote recipient at 206 constitute a second set, which may be the same or different than the first set of the one or more derived digital assets created by transformation at 204. In particular, the second set may be a minor subset of the first. Thus, it is anticipated that not every remote recipient need be offered all of the derived digital assets created by transformation at 204, although they may. Conversely, the first set may be a minor subset of the second. Thus, it is anticipated that the remote recipient may be offered other derived digital assets in addition to those that were created by transformation at 204. For instance, the remote recipient may also be offered the unmodified digital asset in its native format and/or a derived digital asset in a format into which a transformation is available but has not yet been executed. Finally, the first and second sets may share any union, in which some of the derived digital assets created by transformation at 204, and other derived digital assets besides those created by transformation at 204, are offered to the remote recipient.

In some embodiments, the second set of digital assets may be offered to the remote recipient via an Internet web page. The web page may be configured to represent the second set of derived digital assets as options, and the remote recipient may be requested to select from among the options. In examples where the second set contains only one derived digital asset, that asset may be sent to the remote recipient absent any selection by the remote recipient.

At 208, it is determined whether the remote recipient has selected any of the derived digital assets offered at 206. In other words, it is determined whether the remote recipient has issued a request for a digital asset in any of the formats offered at 206. If the remote recipient has issued such a request, then at 210, the requested asset in the requested format is sent over the network to the remote recipient.

A remote recipient may issue a request in a manual or automatic fashion, or both. In other words, a human user may manually select a digital asset in a particular format by choosing from a menu of available options, for example. In some embodiments, a human user need not make a manual selection, because that user's device may automatically select a compatible format or a format to which a user has previously indicated a preference.

In the illustrated embodiment of FIG. 2, the sending of one or more derived digital assets to the remote recipient at 210 may be enabled by methods that depend on whether the asset is immediately available in the desired format, or whether transformation to the desired format is possible but not yet executed. Methods that depend on the availability of an asset or a transformation are illustrated by example in FIG. 4.

Figure 4:
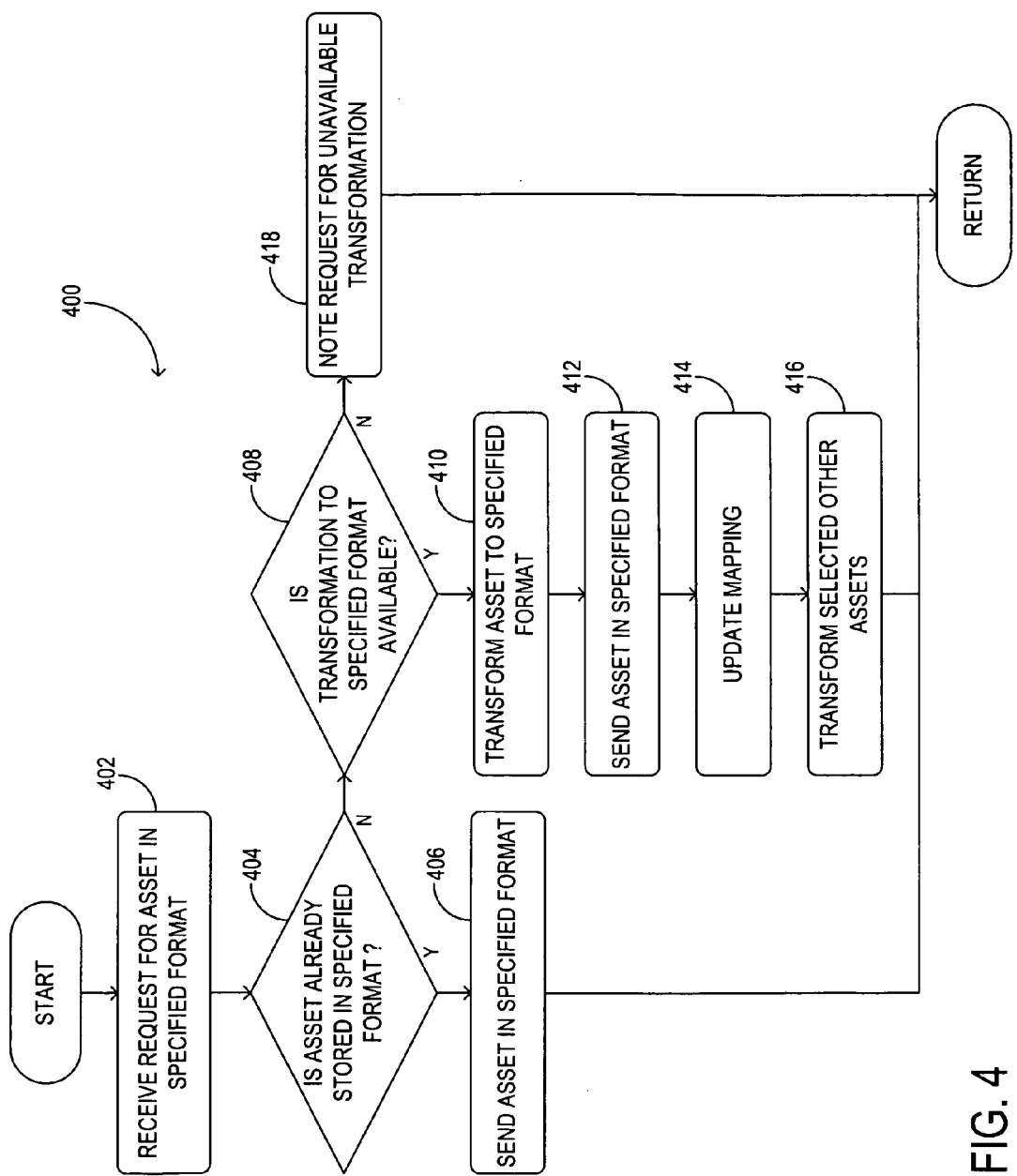
FIG. 4 shows an example method in which a derived digital asset requested by a remote recipient may be sent to the remote recipient in accordance with the present disclosure.

FIG. 4 shows an example process flow 400 of a method in which a derived digital asset requested by a remote recipient may be sent to the remote recipient. Thus, in one embodiment, the method of FIG. 4 may expand upon or be included in step 210 of FIG. 2. In describing the illustrated method, continued numerical reference is made to aspects of FIG. 1.

The method of FIG. 4 may be executed by the server when a remote recipient requests a digital asset in a specified format. The remote recipient may come to request the asset upon accessing a network site where digital assets are provided and being offered one or more derived digital assets (at 206 of FIG. 2, for example).

At 402, the server receives a request for a digital asset in a specified format. At 404, it is determined whether the requested digital asset in the specified format is already stored in data segment 108. If the requested digital asset is already stored in the specified format, then the derived digital asset is sent, at 406, to the remote recipient. However, if the requested digital asset in the specified format is not already stored, then it is determined, at 408, whether transformation to the specified format is available. If transformation to the specified format is available, then the processor, at 410, transforms the appropriate unmodified digital asset to a derived digital asset in the specified format, and at 412, sends the derived digital asset to the remote recipient. Thus, in the illustrated example, a request of the remote recipient triggers transformation of an unmodified digital asset into a derived digital asset.

Step 410 of the illustrated method may be arrived at if code segment 106 contain instructions to carry out a certain transformation, but execution of the transformation is not enabled, i.e., indicated to be automatic, in mapping 300. Whether an available transformation is enabled may depend on a predicted need for the transformation. Thus, when the predicted need for a transformation is great, that transformation may be enabled in the mapping and executed automatically upon receipt of the unmodified digital asset. When the predicted need for a transformation is small, however, the transformation may be disabled and not executed automatically. Instead, a disabled but available transformation may be executed when the request for a digital asset in the specified format is received.

It may be advantageous that the processor be configured to update mapping 300 based on an evolving history of requests for derived digital assets by remote recipients. Thus, when a transformation is executed at 410 above a threshold number and/or frequency, mapping 300 may be updated, at 414, to make the transformation automatic for subsequent, unmodified digital assets. Conversely, when a frequency of requests for an automatically transformed derived digital asset falls below a threshold, the mapping may be updated to disable the automatic transformation.

The enabling of a previously disabled transformation in mapping 300 triggers, at 416, selected other previously received unmodified digital assets to be transformed according to the newly enabled transformation. Thus, in the illustrated example, a request of the remote recipient triggers an update of the mapping, and an update of the mapping triggers transformation of unmodified digital assets into derived digital assets. In particular, such updated transformations can be applied to digital assets that have not yet been requested. Finally, if transformation of the requested digital asset into the specified format is not available, at 408, then the unmet request for the asset is noted at 418 so that a demand for unavailable transformations may be assessed.

Returning briefly to FIG. 2, we note that the offering and the sending of derived digital assets to the remote recipient at 210 may be enabled by methods that depend on a preference of the remote recipient or a characteristic of a recipient device. Thus, it is contemplated that the remote recipient may connect to the network via a recipient device, and the derived digital asset may be formatted for use on the recipient device. Example dependencies of derived digital-asset formats based on a characteristic of the recipient device is illustrated schematically in FIG. 5, while an example process flow that depends on a preference of the remote recipient or on a characteristic of the recipient device is illustrated by example in FIG. 6.

Figure 5:
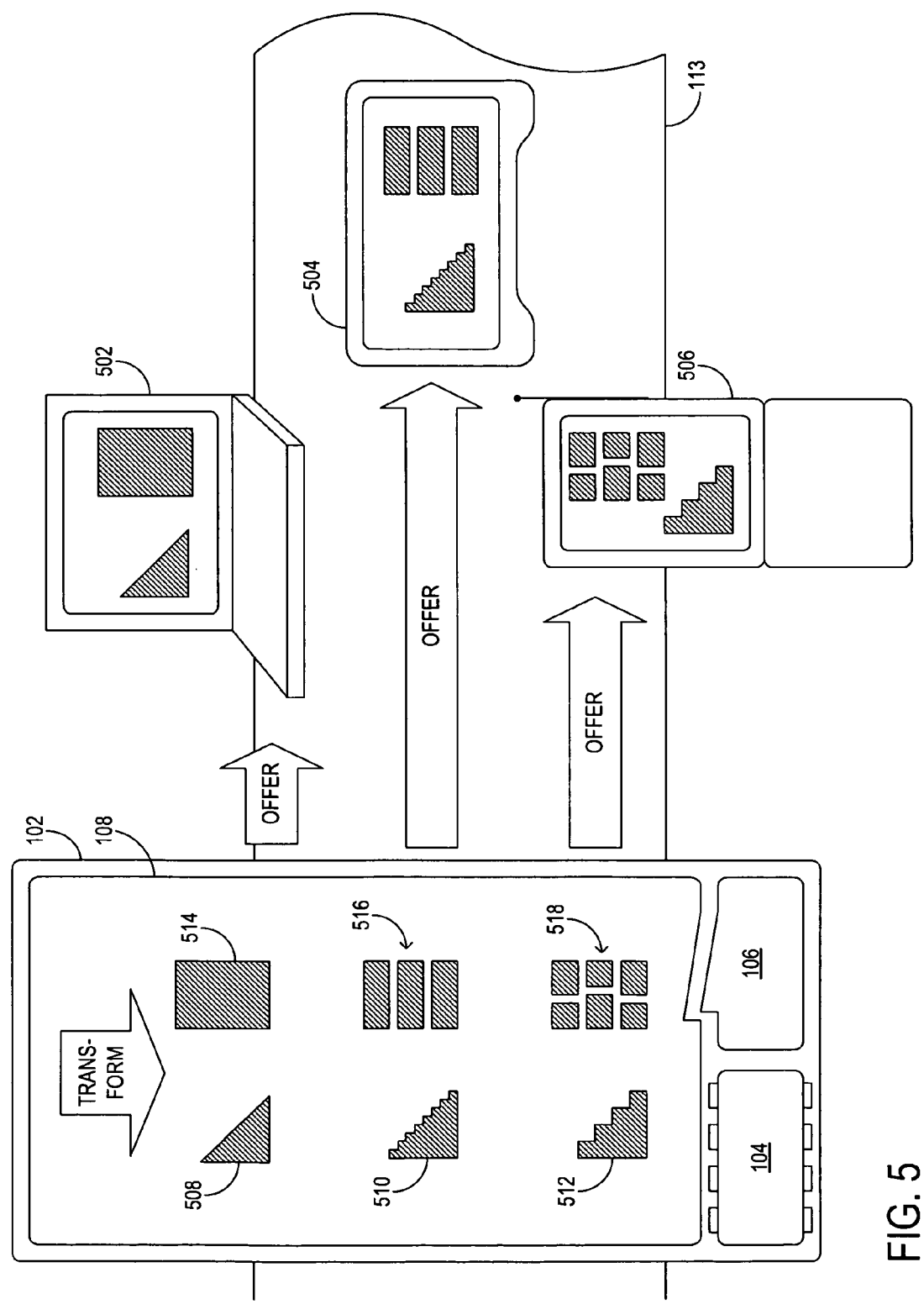
FIG. 5 illustrates example dependencies of derived digital-asset formats based on a characteristic of a recipient device in accordance with the present disclosure.

FIG. 5 shows multiple derived digital assets obtained by transformation of an unmodified digital asset (not shown in FIG. 5) and offered to one or more remote recipients via a plurality of recipient devices. In particular, FIG. 5 shows an offering of an image to three different recipient devices: tablet personal computer (tablet PC) 502, media player 504, and cell phone 506. In the illustrated example, finest-resolution image 508 is offered to the tablet PC; next-finest resolution image 510 is offered to the media player; and coarsest-resolution image 512 is offered to the cell phone. Thus, a derived digital asset may be offered to a remote recipient via a recipient device based on a screen size or display capability of that device.

FIG. 5 also shows an offering of a spreadsheet asset to the same three devices. In the illustrated example, spreadsheet 514 is offered all at once to the tablet PC; larger spreadsheet blocks 515 are offered to the media player; and smaller, more numerous spreadsheet blocks 518 are offered to the cell phone. In other examples, the cell phone may receive spreadsheet blocks as plain text, while recipient devices enabled with greater functionality may receive fully functional spreadsheet files. Thus, a derived digital asset may be offered to a remote recipient via a recipient device based on a storage or data processing capacity of that device.

Figure 6:
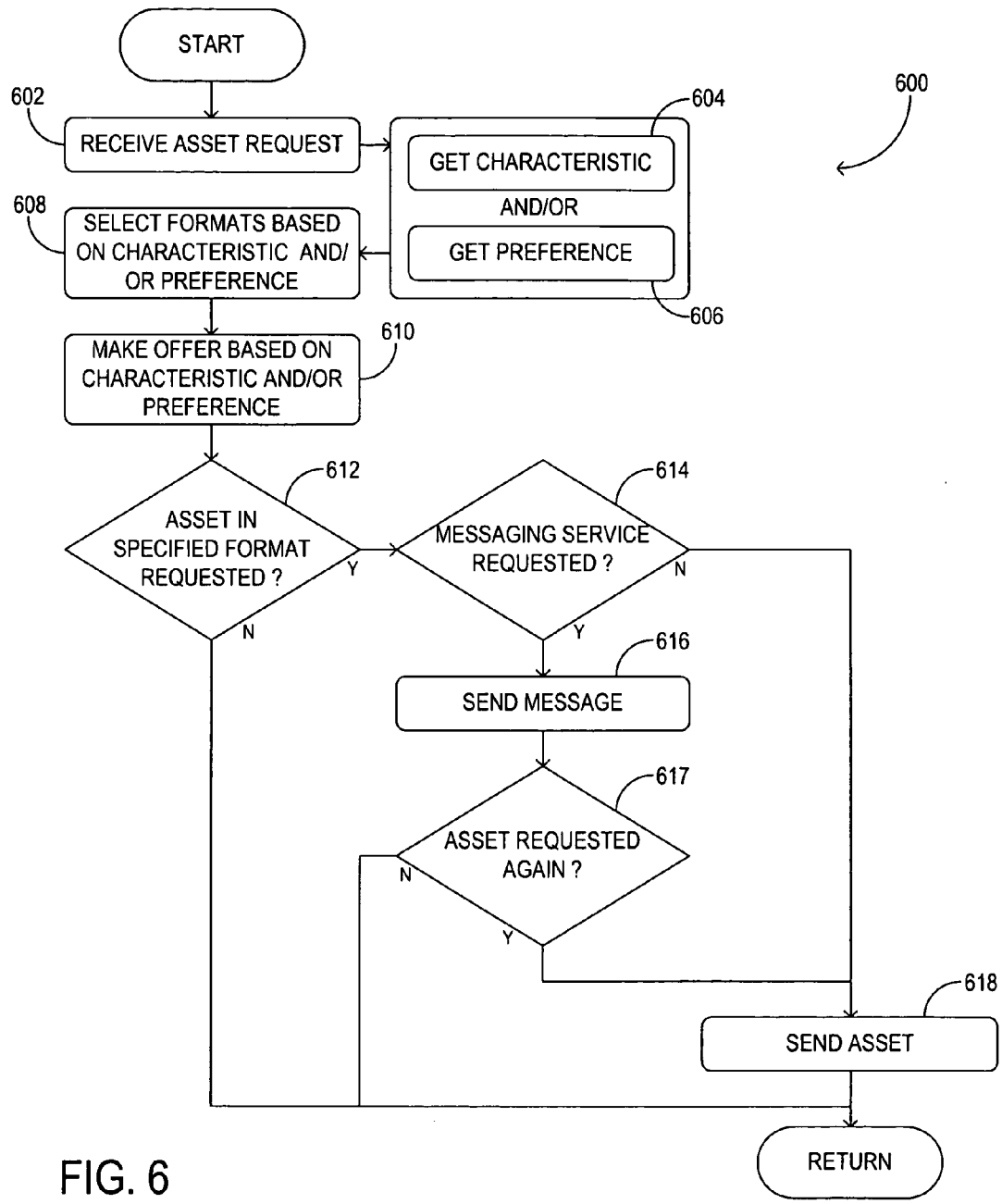
FIG. 6 shows an example method in which a derived digital asset requested by a remote recipient may be offered and sent to the remote recipient in accordance with the present disclosure.

FIG. 6 shows an example process flow 600 of a method in which a derived digital asset requested by a remote recipient may be offered and sent to the remote recipient. Thus, in one embodiment, the method of FIG. 6 may expand upon or be included within steps 206-210 of FIG. 2. In describing the method, continued numerical reference is made to aspects of FIG. 1. The illustrated method may be executed by the server when a remote recipient requests a digital asset. The remote recipient may come to request the digital asset upon accessing a network site where digital assets are provided.

At 602, the server receives a request for a digital asset from recipient device 112. At 604, the server interrogates the recipient device to determine characteristics of the device. In some embodiments, the characteristics may include a device type: a personal computer (PC), a tablet PC, a personal digital assistant (PDA), a handheld game system, a music player, or a cell phone, as examples. In other embodiments, the information may include a display-screen size, a display-screen resolution, a display-screen color depth, as examples.

At 606, the server interrogates the recipient device for a preference of the remote recipient. The preference may be indexed to an identity or profile of the remote recipient or the remote device. Thus, interrogating the recipient device for a preference may comprise determining a login name of the remote recipient or a network address or device identification number of the remote device. The server may then look up from a stored database one or more preferences of the remote recipient based on the identity or profile of the remote recipient or the remote device. In other embodiments, the preference may comprise a retrieving and reading a cookie or other stored preference from the recipient device. In still other embodiments, the remote recipient may expressly specify one or more preferences in connection with the derived-digital asset request.

At 608, the server automatically selects one or more formats in which to offer the requested digital asset based on the determined characteristics of the recipient device and/or the preference of the remote recipient. For example, the characteristics may indicate that the recipient device is a cell phone with a monochromatic display and 1 megabyte of available memory. In that event, the server may automatically select a low-resolution bitmap with 1-bit color depth, and would avoid selecting high-resolution, color-deep bitmaps. Thus, it is contemplated that the server may automatically select a non-native format based on a characteristic of the remote device in advance of offering the derived digital asset to the remote recipient.

In another example, the preference of the remote recipient may indicate that he or she has previously requested to view image content as JPEG files. If so, the server may automatically select JPEG as a format in which to offer the requested derived digital asset to the remote recipient. Thus, it is contemplated that the server may automatically select a non-native format based on prior digital-asset requests of the remote recipient in advance of offering the derived digital asset to the remote recipient.

At 610, the server offers the requested digital asset in one or more of the formats selected at 608 to the remote recipient. In formulating the offer, i.e., in presenting the format options, the server may make use of the recipient device characteristics acquired at 604. For example, the range of non-native formats in which the requested asset is offered may be presented differently on a small display screen such as that of a cell phone than on a large computer monitor. Thus, the illustrated method includes acquiring a characteristic of the recipient device, and offering the derived digital asset to the remote recipient based on the characteristic. In other words, both the content itself, and the manner in which the menu of content is presented to the user can be influenced by characteristics and/or preferences of the remote recipient.

In some embodiments, the offering at 610 may be configured by the remote recipient to be automatic in terms of the formats offered and/or the manner in which the offer is formulated. For example, the server may be configured so that every time a particular recipient device is synced, some particular digital asset is offered (or transformed and then offered) to the remote recipient in a manner predetermined by the remote recipient and/or by characteristics of the remote device.

At 612, the server determines if the remote recipient has requested a digital asset in a specified format. If the remote recipient has made such a request, then at 614, the server determines if messaging service has also been requested. In one embodiment, a recipient may request that a message including a network address of a requested digital asset in a specified format be sent to a recipient device before the actual asset is sent. In this embodiment, the recipient device is configured to receive the message, and the illustrated method further comprises transmitting a network address in the form of a message to the recipient device in response to the remote recipient requesting the derived digital asset. A remote recipient may make such a request when selecting an asset from a desktop computer, for instance, while intending to view or use the asset on a cell phone with limited network browsing capability. If messaging service has been requested, then the server, at 616, sends a message to the recipient device that includes a network address of the requested derived digital asset in the specified format. In some embodiments, the message is conveyed over a second network, different from the network used to send the derived digital asset to the remote recipient. In one specific and non-limiting example, the second network may be a cellular network, and the message may be a text message conveyed via a short message service (SMS). Further, in some examples in which the network is the Internet, the network address may include a hyperlink, e.g., http://www.usergroup.org/assets/myasset.bmp.

At 617, the server determines if the derived digital asset in the specified format has been requested again, this time from the recipient device which has received the message with the network address included. Process flow then merges at 618, where the server sends the requested derived digital asset to the remote recipient via the recipient device, whether or not the messaging service was requested.

It will be appreciated that the embodiments described herein may be implemented, for example, via computer-executable instructions or code, such as programs, stored on computer-readable storage media and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, personal computers, servers, laptop computers, hand-held devices, microprocessor-based programmable consumer electronics and/or appliances, etc.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes may be changed without parting from the scope of this disclosure. The subject matter of the present disclosure includes all novel and nonobvious combinations and sub-combinations of the various processes, systems and configurations, and other features, functions, acts, and/or properties disclosed herein, as well as any and all equivalents thereof.

The invention claimed is:

1. A method for sharing a digital asset within a user group via a network portal of the user group, the method comprising:
   receiving an unmodified digital asset in a native format;
   transforming the unmodified digital asset into a derived digital asset of a specified format suitable for access via a handheld device of a first remote user;
   receiving from the first remote user a request for a digital asset derived from the unmodified digital asset but suitable for access via the handheld device;
   interrogating the handheld device to determine one or more of a characteristic of the handheld device and a preference of the first remote user;
   via the network portal of the user group and based on the one or more of the characteristic and the preference, offering the first remote user the derived digital asset of the specified format; and
   in response to the first remote user requesting the derived digital asset of the specified format from the network portal of the user group, sending said derived digital asset of the specified format to the handheld device.

2. The method of claim 1, wherein the unmodified digital asset is received from a second user.

3. The method of claim 1, wherein the unmodified digital asset is received from a network source at a request of a second user.

4. The method of claim 1, wherein the handheld device is configured to receive a text message, the method further comprising transmitting a network address in a message to the handheld device in response to the first remote user requesting the derived digital asset of the specified format, the network address enabling the handheld device to receive the derived digital asset of the specified format.

5. A method of providing a digital asset to a remote recipient via a network, the method comprising:
   receiving an unmodified digital asset in a native format;
   receiving from the remote recipient a request for a digital asset of a specified non-native format derived from the unmodified digital asset;
   transforming the unmodified digital asset into a derived digital asset of the specified non native format in response to the request of the remote recipient;
   sending the derived digital asset of the specified non native format to the remote recipient, and
   transforming selected other unmodified digital assets in native formats to derived digital assets of the specified non native format, in response to the request of the remote recipient.

6. The method of claim 1, wherein the digital asset of the specified format is one of a first plurality of derived digital assets, each derived by transforming the unmodified digital asset, and one of a second plurality of digital assets, each offered to the first remote user.

7. The method of claim 5, wherein the unmodified digital asset is received from the remote recipient.

8. The method of claim 1, wherein receipt of the unmodified digital asset triggers transformation of the unmodified digital asset into the derived digital asset of the specified format.

9. The method of claim 1, wherein the request of the first remote user triggers transformation of the unmodified digital asset into the digital asset of the specified format.

10. The method of claim 5, wherein the selected other unmodified digital assets in native formats are transformed into one or more derived digital assets according to a mapping, which maps a plurality of native formats to a plurality of non-native formats.

11. The method of claim 10, wherein an update of the mapping triggers transformation of the selected other unmodified digital assets.

12. The method of claim 11, wherein the request of the remote recipient triggers the update.

13. The method of claim 5, wherein the remote recipient connects to the network via a device, and wherein the derived digital asset of the specified format is formatted for use on the device.

14. The method of claim 1, further comprising automatically selecting the specified format based on the characteristic of the handheld device, and in advance of offering the first remote user the digital asset of the specified format.

15. The method of claim 1, further comprising automatically selecting the specified format based on prior digital-asset requests of the first remote user, and in advance of offering the digital asset of the specified format to the first remote user.

16. The method of claim 5, wherein the unmodified digital asset includes a first rendering of an image, wherein the derived digital asset of the specified format includes a second rendering of the same image, and wherein one or more of a resolution, a size, and a color depth is greater in the first rendering than in the second rendering.

17. A digital asset format transformation server comprising:
   a processor and
   a memory, wherein the memory stores instructions that, when executed by the processor, causes the processor to:
   receive an unmodified digital asset in a native format from a remote source;
   transform the unmodified digital asset into a derived digital asset stored in a non-native format;
   receive from a remote recipient a request for a digital asset derived from the unmodified digital asset but suitable for access via a handheld device of the remote recipient;
   offer the derived digital asset to the remote recipient via a network, wherein the derived digital asset is one of a first plurality of derived digital assets, each derived by transforming the unmodified digital asset, and one of a second plurality of derived digital assets, each offered to the remote recipient; and
   send the derived digital asset to the remote recipient in response to a request of the remote recipient.

18. The method of claim 6, wherein the second plurality is a lesser subset of the first.

19. The method of claim 4, wherein said digital asset is sent to the handheld device in response to the message being received and affirmatively responded to via the handheld device.

20. The method of claim 6, wherein the first and second pluralities are the same, such that each derived digital asset from the first plurality of derived digital assets is offered to the remote recipient.

21. The of digital asset format transformation server of claim 17, wherein the second plurality is a lesser subset of the first.

* * * * *